United States Patent [19]
Kardos

[11] 3,954,121
[45] May 4, 1976

[54] VENT CHECK VALVE
[75] Inventor: George W. Kardos, Euclid, Ohio
[73] Assignee: The Weatherhead Company, Cleveland, Ohio
[22] Filed: Mar. 17, 1975
[21] Appl. No.: 559,261

[52] U.S. Cl. .............................................. 137/525
[51] Int. Cl.² ........................................ F16K 15/14
[58] Field of Search ...................... 137/525; 251/337

[56] References Cited
UNITED STATES PATENTS
1,797,280   3/1931   Zerk .................................... 137/525
3,807,445   4/1974   McPhee ........................... 137/525 X FOREIGN PATENTS OR APPLICATIONS
797,053   10/1968   Canada ............................... 137/525
971,715    8/1950   France ................................ 137/525

Primary Examiner—William R. Cline
Attorney, Agent, or Firm—McNenny, Farrington, Pearne & Gordon

[57] ABSTRACT

A vent check valve having a relatively flat configuration of its elements, being thereby adapted to utilize a local wall area of a housing to be vented as a supporting body and to provide a valve seat. The valve elements include an elastomeric flat diaphragm and a retainer for holding the diaphragm against the valve seat. These elements are disposed in respective counterbores formed in the wall body concentrically with the valve seat. The retainer has a spiderlike configuration with circumferential legs dimensioned to flex rearwardly in the associated counterbore upon installation to produce a self-locking wedge fit therein.

8 Claims, 4 Drawing Figures

U.S. Patent  May 4, 1976  3,954,121
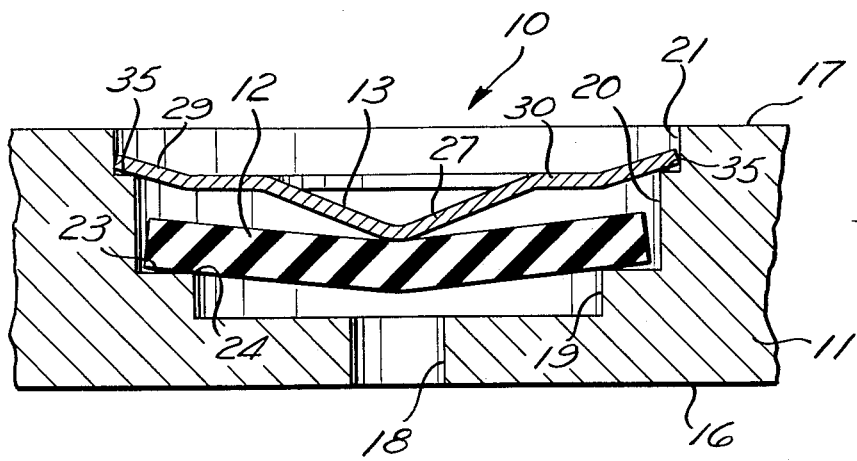
Fig. 1
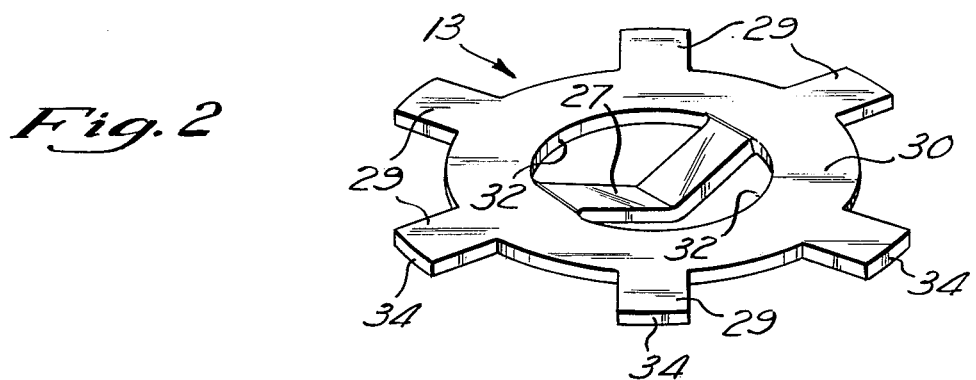
Fig. 2
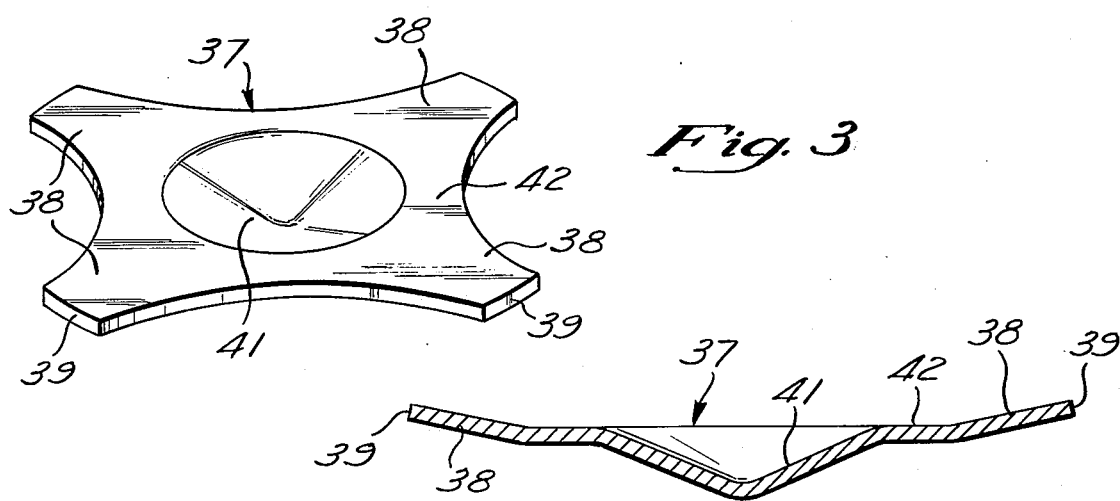
Fig. 3
Fig. 4

VENT CHECK VALVE

BACKGROUND OF THE INVENTION

The invention relates to check valves and, in particular, to a diaphragm-type of check valve for venting an enclosed space.

Housings of various structures and systems may require venting of their interior to the surrounding atmosphere to prevent excessive build-up of internal fluid pressure. Such housings include control valve bodies having chambers that are intended to remain free of hydraulic fluid for proper control action and in which provision must be made for venting any leakage into the chamber to prevent control failure by development of a hydraulic lock. Other frequently encountered applications of such vent check valves include otherwise sealed mechanical transmission or pump housings in which excess heat may cause expansion of a gas or a liquid lubricant, creating undesirable internal pressure on the seals of the housing. In these and similar cases, a venting path is fitted with a check or one-way valve to prevent entry of contaminants and moisture into the housing.

One type of check valve, like the present invention, employs a resilient diaphragm as a single moving valve element. Examples of check or relief valves employing diaphragms are shown in U.S. Pat. Nos. 3,228,418 to Rosback et al. 3,519,012 to Van Patten, and 3,807,445, to McPhee.

SUMMARY OF THE INVENTION

The invention provides a vent check valve structure which is adapted to utilize a local wall area of the housing being vented as a support for its separate elements and to provide a valve seat. This utilization of an integral portion of the housing wall itself is permitted by the shallow construction of the separate valve elements and their manner of mounting in the housing wall. Ideally, the separate elements include a flat diaphragm adapted to seal a seat formed in the housing wall and a retainer for the diaphragm held in the housing by an interference fit.

In the preferred embodiment, a resilient elastomeric diaphragm and a metal retainer element are economically formed by blanking from suitable sheet stock. The retainer has a spider configuration with its legs dimensioned with respect to a cylindrical housing wall bore to flex rearwardly upon forward installation movement to develop a self-locking wedge fit therein.

In addition to affording relatively economical manufacture of the separate diaphragm and retaining elements, the invention minimizes other costs by utilizing the wall of the housing to be vented as the body for the support of these elements. This approach avoids the material cost, handling, and eventual assembly of such a separate body on a housing to be vented. Further, the disclosed bore structure for receiving the diaphragm and retainer elements is readily produced by machining, molding, or other operation without difficulty or complex tooling.

BRIEF DESCRIPTION OF THE DRAWING

FIG. 1 is a cross sectional view of a vent check valve assembly constructed in accordance with the present invention;

FIG. 2 is a perspective view of one embodiment of a retainer element for the disclosed valve assembly of FIG. 1;

FIG. 3 is a perspective view of a second embodiment of a retainer element for the disclosed valve assembly; and FIG. 4 is a cross sectional view of the retainer element of FIG. 3.

DESCRIPTION OF THE PREFERRED EMBODIMENTS

Referring to FIGS. 1 and 2, there is shown a check valve vent assembly 10 which includes a valve body 11, a diaphragm 12, and a retainer 13. The valve body 11, as illustrated in FIG. 1, may be a relatively small area of a wall of a housing to be vented, with oppositely facing surfaces 16 and 17 representing the interior and exterior, respectively, of such housing. The body 11 is stop drilled or otherwise formed with a central vent passage 18, a cylindrical inner bore 19, and successive concentric, cylindrical counterbores 20 and 21.

The intersection of a radial surface 23 at the base of the first counterbore 20 and the inner bore 19 forms an edge or annular valve seat 24. As shown, the radial width of the surface 23 extending under the diaphragm 12 is relatively small compared to the diameter of the diaphragm, so that the diaphragm is axially supported by the body 11 solely at its outer periphery. The inner bore 19 has sufficient depth to receive a central area of the diaphragm 12 deflected inwardly by the retainer 13. Similarly, the first counterbore 20 is of sufficient depth to at least receive the thickness of the diaphragm 12 and a central portion 27 of the retainer 13. The second or outer counterbore 21, in turn, has a depth sufficient to fully receive the thickness of the outer peripheral portion of the retainer 13 and, as shown, has a depth at least equal to twice the thickness of the retainer to assure that all areas of the retainer are within or below the plane of the outer surface 17 of the body 11. As illustrated, the vent passage 18 is substantially smaller in diameter than the intermediate bore 19.

The diaphragm 12 is a normally flat, imperforate, circular body of resilient material, preferably an elastomeric material having a preferable hardness of approximately 50 Durometer (Shore A). The illustrated diaphragm is blanked from elastomeric sheet stock in a thickness, for example, of 1/32inch, or is molded to size. The diaphragm 12 is dimensioned diametrally with respect to the associated bore 20 to provide a fit loose enough for ease of assembly but close enough to permit the bore to substantially center the diaphragm over the seat 24. In the illustrated arrangement, for example, a nominal clearance of between 0.010–0.012 inch for a diaphragm diameter of 0.346 inch and a seat diameter of 0.275 inch is used.

The retainer 13 is an integral body having a spider-like configuration. The illustrated retainer 13 is formed by blanking from 0.010 inch steel sheet stock, and has a final Rockwell hardness of appproximately 49 Rc to be relatively rigid after assembly. The retainer 13 includes a plurality of circumferentially spaced legs 29 interconnected by a circular web 30. The center section 27 of the retainer 13 protrudes from the plane of the web 30 and lies generally within an axial cone which intersects the inner circumferential boundary of the web. A pair of apertures 32 are punched or otherwise formed on opposite sides of the center section 27.

Outer edges 34 of the legs 29 are described by a common circle which, in a free state, is slightly larger than the associated bore 21 to provide an interference fit therein. The legs 29, in their free state, may be planar with the web 30, or may be in a slightly dished condition away from the center section 27 as a result of the blanking process. The protrusion of the center section 27 is sufficient, when the legs 29 rest on a radial surface 35 at the base of the associated counterbore 21, to engage and deflect a center portion of the diaphragm 12 inwardly so that the outer peripheral area of the diaphragm is resiliently held in sealing contact with the seat 24.

Assembly of the diaphragm 12 and retainer 13 is accomplished by first positioning the diaphragm within its receiving bore 20 and subsequently forcing the retainer 13 into its bore 21 into abutting engagement with the surface 35. Due to the interference fit of the legs 29 with the bore 21, the legs are preferably elastically deflected or folded slightly rearwardly into a relatively shallow or relatively flat conical configuration. This rearward deflection produces a wedging or self-locking action, wherein the outer edges 34 of the legs 29 tend to tightly engage the surface of the bore 21. The wedging action provided by the leg structure allows the retainer 13 to be manually or mechanically inserted with a relatively light installation force in comparison to the axial resistance or retaining capacity of the retainer against forces tending to expel it. By proper dimensioning of the length of the legs 29 relative to the bore 21 and/or by application of relatively high forces, as desired, the legs can be set in a relatively flat or planar configuration in the bore.

The assembly 10 is particularly useful in venting a chamber or enclosure of excess fluid pressure or volume. Fluid pressure existing at the inner body surface 16 and communicated to the intermediate bore or chamber 19 by the vent passage or hole 18 is operative to lift the peripheral portion of the diaphragm 12 outwardly away from the seat 24 to relieve such pressure. Movement of the radially outward portion of the diaphragm 12 is permitted by the axial spacing of the leg and web portions 29,30 from the apex of the center section 27 of the retainer 13. Fluid passes through the spaces between the legs 29 and the apertures 32. By contrast, entrance of contaminating fluids or solids into the chamber 19 is checked by the seating action of the diaphragm 12 on the seat 24.

The shallow configuration of the assembly 10 permits it to be incorporated into an existing wall of a housing so that it shares such a wall as its own body, thereby avoiding the requirement for a separate supporting body, which would otherwise require its separate fabrication and assembly to the housing. One application of the assembly 10 is the venting to atmosphere of a chamber in a hydraulic control valve to prevent the occurrence of a hydraulic lock therein. In this case, the housing, as represented by the body 11, is formed of brass, aluminum, or other readily machined or formed material, which is characteristically softer than the material forming the retainer 13 so that the legs 29 tend to bite into the housing surface at the bore 21 to thereby improve its resistance to removal from its installed position.

Referring to FIGS. 3 and 4, there is shown an alternative embodiment of the retainer 13, wherein a retainer 37 is provided with a slightly different configuration. The retainer 37 is an integral body, again blanked from steel sheet stock and having a plurality of circumferentially spaced legs 38. Outer edges 39 of the legs are defined by a diameter which, again, is dimensioned to interfere with the associated body bore 21. An imperforate center section 41 of the retainer 37 is formed in the shape of a cone and projects from the plane defined by the legs 38 and an intermediate area 42. This alternative retainer 37 is installed and functions in substantially the same manner as that set out above in connection with the retainer 13, except that vented fluid escapes between the legs 38 exclusively, since there are no apertures in the body of the retainer.

While the invention has been described in connection with specific embodiments thereof, it is to be clearly understood that this is done only by way of example, and not as a limitation to the scope of the invention as set forth in the objects thereof and in the appended claims.

What is claimed is:

1. A vent check valve comprising a body having a vent for exhausting fluid to the atmosphere, the vent of the body including an inner bore, means providing communication from the interior of the body to the inner bore, a counterbore axially outward of the inner bore, said counterbore including a generally radial face adjacent its inward end, said radial face intercepting the outer end of said inner bore to form an annular seat, a resilient diaphragm disposed in said counterbore, bore means axially outward of the portion of said counterbore in which said diaphragm is disposed, said bore means being nonre-entrant along its axis, a diaphragm retainer of resilient sheet material disposed in said bore means, said retainer having a radially and axially outward, relatively flat area dimensioned to provide an interference fit with said bore means preventing release of said retainer from said bore means, said retainer including at its center means for deflecting a central portion of said diaphragm into said inner bore and normally biasing radially outward portions of said diaphragm into sealing engagement with said seat and permitting said radially outward portions of said diaphragm to flex axially outwardly away from said seat under the influence of fluid pressure in said inner bore in excess of atmospheric pressure, said retainer including means for permitting exhaust of fluid past said diaphragm to the atmosphere on the exterior of said body.

2. A vent check valve as set forth in claim 1, wherein said relatively flat area is dished axially outwardly with increasing distance from the center of the retainer whereby such dished structure provides a wedgelike fit in said bore permitting low force installation of said retainer in said bore means.

3. An assembly as set forth in claim 1, wherein the radially and axially outward, relatively flat area of said retainer comprises a plurality of radially extending, circumferentially spaced legs, the spaces between said legs providing said means for permitting fluid exhaust.

4. An assembly as set forth in claim 3, wherein said legs are inclined axially outwardly, each of said legs lying in the surface of a common relatively shallow cone.

5. An assembly as set forth in claim 4, wherein the center section of said retainer is integrally formed with the remainder of the retainer, said center section forming at least a part of a cone sloping axially inwardly substantially more than the slope of the cone defined by said legs.

6. An assembly as set forth in claim 3, wherein said legs are formed of a material harder than the material forming said bore means on said body whereby said legs tend to bite into the body surface forming said bore means to prevent accidental movement of said retainer from said bore means.

7. An assembly as set forth in claim 3, wherein said bore means is a second counterbore concentric to and axially outward of said first-mentioned counterbore, said legs being disposed in said second counterbore and positioned against a radial surface forming an axially inward end of said second counterbore whereby the axial position of said retainer in said body is determined.

8. A vent check valve assembly comprising a body having an inner bore, means communicating fluid pressure from an interior side of the body to the inner bore, first and second cylindrical counterbores outward of and coaxial with said inner bore, a radial surface at the base of the first counterbore and intercepting the inner bore to form an annular valve seat, an imperforate circular elastomeric diaphragm positioned in said first counterbore, said diaphragm having a diameter slightly less than the diameter of the first counterbore and having a flat configuration in a free state, a retainer blanked from sheet stock and having a plurality of circumferentially spaced legs, the radially outer edges of said legs defining a free diameter larger than the diameter of said second counterbore, said retainer being disposed in said second couunterbore against a radial surface at the base of said second counterbore, said legs being axially folded outwardly into a shallow cone to produce a wedge fit in said second counterbore, said retainer having an integral center section extending into said first counterbore and pressing against a central area of said diaphragm to hold said diaphragm in a flexed condition with its outer periphery in sealing engagement with said seat, radially outer portions of said retainer being axially spaced from said outer periphery of the diaphragm, whereby said outer diaphragm periphery is adapted to be displaced axially outwardly from said seat by excess fluid pressure in said inner bore.

* * * * *